US005845381A

United States Patent [19]

Cuddy

[11] Patent Number: 5,845,381

[45] Date of Patent: Dec. 8, 1998

[54] APPARATUS FOR EXPLOSIVE REMOVAL OF TAPERED KEYS

[76] Inventor: Jack Cuddy, 717 Lake St. #6, Grangeville, Id. 83530

[21] Appl. No.: 651,444

[22] Filed: May 22, 1996

Related U.S. Application Data

[63] Continuation-in-part of Ser. No. 379,320, Jan. 25, 1995, abandoned.

[51] Int. Cl.[6] .................. B23P 19/04

[52] U.S. Cl. .................. 29/254; 29/239

[58] Field of Search .................. 29/254, 255, 275, 29/261, 421.2, 239; 72/430

[56] References Cited

U.S. PATENT DOCUMENTS

| | | | |
|---|---|---|---|
| 2,331,167 | 10/1943 | Brecht et al. | 29/254 |
| 3,956,815 | 5/1976 | Capper et al. | 29/421.2 |
| 3,986,242 | 10/1976 | Kerr | 29/261 |
| 4,463,489 | 8/1984 | James | 29/261 |
| 5,257,445 | 11/1993 | Mayberry | 29/261 |

*Primary Examiner*—Robert C. Watson

[57] ABSTRACT

A compact device employing the controlled use of explosives to quickly and easily remove tapered keys, as typically lodged into a notched shaft for purposes of attaching machinery such as a sprocket, gear, flywheel or coupling to a shaft. The invention consists of an explosion-resistant plunger which fits flush into an explosion-resistant block frame. The plunger covers, as a lid, a compartment in the frame into which a predetermined amount of gunpowder or similar explosive is placed. The invention is positioned between the block of a tapered key and the hub of the machinery from which the key is to be removed. A length of fuse is inserted into the compartment through an aperture in the frame for ignition of the explosive, such that the resulting explosion forces the invention plunger against the hub and frame in the opposite direction against the block of the tapered key, in turn loosening the tapered key from the hub. Several explosion-resistant adapters of various shapes and sizes accompany the invention to hold the invention in position, achieve a tight fit and increase surface area contact between the invention frame, tapered key block, and the machinery from which said key is to be removed.

2 Claims, 11 Drawing Sheets

APPARATUS FOR EXPLOSIVE REMOVAL OF TAPERED KEYS

This application if a C.I.P. of application Ser. No. 08/379,320 filed Jan. 25, 1995 now abandoned.

BACKGROUND

1. Field of the Invention

The present invention generally relates to tools employing the controlled use of explosives to accomplish a specific task, more specifically to an apparatus using a controlled explosion to remove tapered keys from machinery.

BACKGROUND

2. Discussion of Prior Art

Tapered keys are commonly used with heavy machinery to lock a hub onto a shaft. Tapered keys accomplish this function when forcefully lodged into a notch, cut lengthwise on the shaft periphery, thereby expanding the shaft into a tight fit with the surrounding hub.

Specifically, tapered keys are employed to hold a sprocket, gear, flywheel, coupling or other such device onto a shaft, enabling such devices to turn or rotate with the shaft.

Tapered keys are generally made of steel and are available in a variety of sizes, with a substantially rectangular shape that tapers on one side at a rate of approximately 18" per foot.

The larger end of a tapered key forms a rectangular block which can be pounded with a hammer to lodge the key into place. The block of a tapered key is not pounded flush against a hub, but extends out such that a space of approximately 1" remains between the hub and the key block.

On occasion, tapered keys will fracture under stress or otherwise require removal. Removal of a tapered key is difficult since they are lodged tightly in order to effectively secure one of the aforementioned devices to a shaft.

Removal of a tapered key is usually accomplished by pounding a wedge or other object between the hub and the block of the key in such a manner as to loosen the key from its position. If insufficient space exists between the hub and the key block or if the key is lodged too securely to effectively pry the key loose in this manner, an extension of some sort must be welded onto the end of the block such that the key can be pulled out by its extension. In either case, removal is difficult and time consuming. In addition, these methods are haphazard and can result in damage to the equipment and machinery involved or to the key itself.

The present invention provides an improved method for removing tapered keys from machinery. In the preferred embodiment, a removable elliptical plunger fits flush in one surface of a rectangular block frame. The plunger covers, as a lid, a compartment inside the frame. A small fuse aperture extends through one external side of the frame into the compartment space. Both the plunger and frame are composed of solid stainless steel alloy or other explosion-resistant material.

Steel bolts are threadedly engaged with apertures on either side of the fuse aperture, located on a shared side of the frame and joined by a steel chain or similarly strong and flexible member, that is extended around the shaft end, to hold the invention frame snugly around the shaft housing a tapered key.

In the inventor's search of the prior art, no similar inventions were identified for discussion in this application.

In use, the compartment space in the frame is filled to the top of a shoulder with gun powder or similar explosive and the plunger seated on top of the gun powder so that the top external surface of the plunger rests flush with the external surface of the frame and the bottom edge of the plunger rests flush on the compartment shoulder. The appropriate measure of gun powder is predetermined and only that amount will fit into the compartment space while still allowing the plunger to sit properly.

The apparatus is then placed in the space between a hub and the block of the tapered key to be removed, with the plunger facing the hub, fuse aperture and threaded bolt apertures up. A set of steel wedges and adapters of various shapes and sizes will accompany the invention and can be inserted at appropriate locations between the frame, hub, and key to obtain a snug fit.

Specific to the preferred embodiment, two "L"-shaped bracket adapters are placed with crooks on the invention frame, one on either side of the tapered key block and may be welded onto the tapered key block or secured thereto with a vise grip allowing greater surface area contact between the block and invention frame.

Two threaded apertures are situated on either side of the fuse aperture on a shared side of the frame, adjacent to the side of the frame housing the compartment opening. A bolt is threadedly engaged into each aperture. One end of a length of chain or a similarly flexible and strong member is attached to each bolt. The length of flexible member extending between the two bolts is wrapped around the lower portion of the shaft end in which the tapered key is lodged in order to hold the invention frame securely to the shaft.

A piece of fuse is then inserted through the fuse aperture such that one end contacts the gun powder inside the compartment. When the fuse is lit, the resulting explosion of gun powder thrusts the plunger against the adjacent hub surface and the frame of the invention in the opposite direction against the block of the tapered key and adjoining "L"-brackets with force sufficient to loosen the tapered key for removal.

OBJECTS AND ADVANTAGES

While the pounding and prying heretofore required for conventional tapered key removal involves considerable time, physical exertion, and often at least minor damage to the key and surrounding equipment and machinery, the present invention quickly and easily accomplishes the task without such problems.

The present invention can be used to effectively remove a tapered key with a minimum of time, expense, and physical exertion. In addition, the explosion involved is completely contained in the invention's explosion-resistant frame; therefore, in the process of use, neither the key nor associated equipment and machinery is subject to damage.

The invention can be manufactured easily and inexpensively in different shapes and sizes to accommodate removal of tapered keys in the many contexts in which tapered keys are used. The present invention is also economical for use by consumers in that it is susceptible to indefinite reuse.

SUMMARY

Accordingly, the reader will see that the subject invention can be used to remove tapered keys from machinery more quickly and easily than heretofore possible by other available means and without damage to the key or machinery involved.

There has thus been outlined, rather broadly, the more important features of this invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components as set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office, the public generally, and especially the scientists, engineers, and practitioners in the art who are not familiar with patent or legal terms and phraseology, to determine quickly from a cursory inspection, the nature and essence of the technical disclosure of the application. The abstract is neither intended to define the invention of the application, which is measured by the claims, nor is it intended to be limiting as to the scope of the invention in any way.

It is therefore an object of the present invention to provide a means for quickly and easily removing tapered keys from machinery and other heavy equipment Additional objectives of the present invention include: providing such a device which may be easily and efficiently manufactured and marketed; providing such a device of durable and reliable construction making the device subject to indefinite reuse; providing such a device which is susceptible of a low cost of manufacture with regard to both materials and labor, accordingly making the subject invention economically available to the buying public; providing such a device of compact size making the same subject to easy transportation and manipulation; providing such a device which is conducive to manufacture in a variety of shapes and sizes in order to facilitate the removal of tapered keys in the many contexts in which tapered keys are used; and providing such a device which enables quick, convenient use, removal and reuse.

These together with other objects of the invention, along with the various features of novelty which characterize the invention, are specified in the claims annexed to and forming part of this disclosure. For a better understanding of the invention, its advantages and the specific objects attained by its uses, reference should be made to the accompanying drawings and descriptive matter in which there are illustrated preferred embodiments of the invention.

Figure 1:
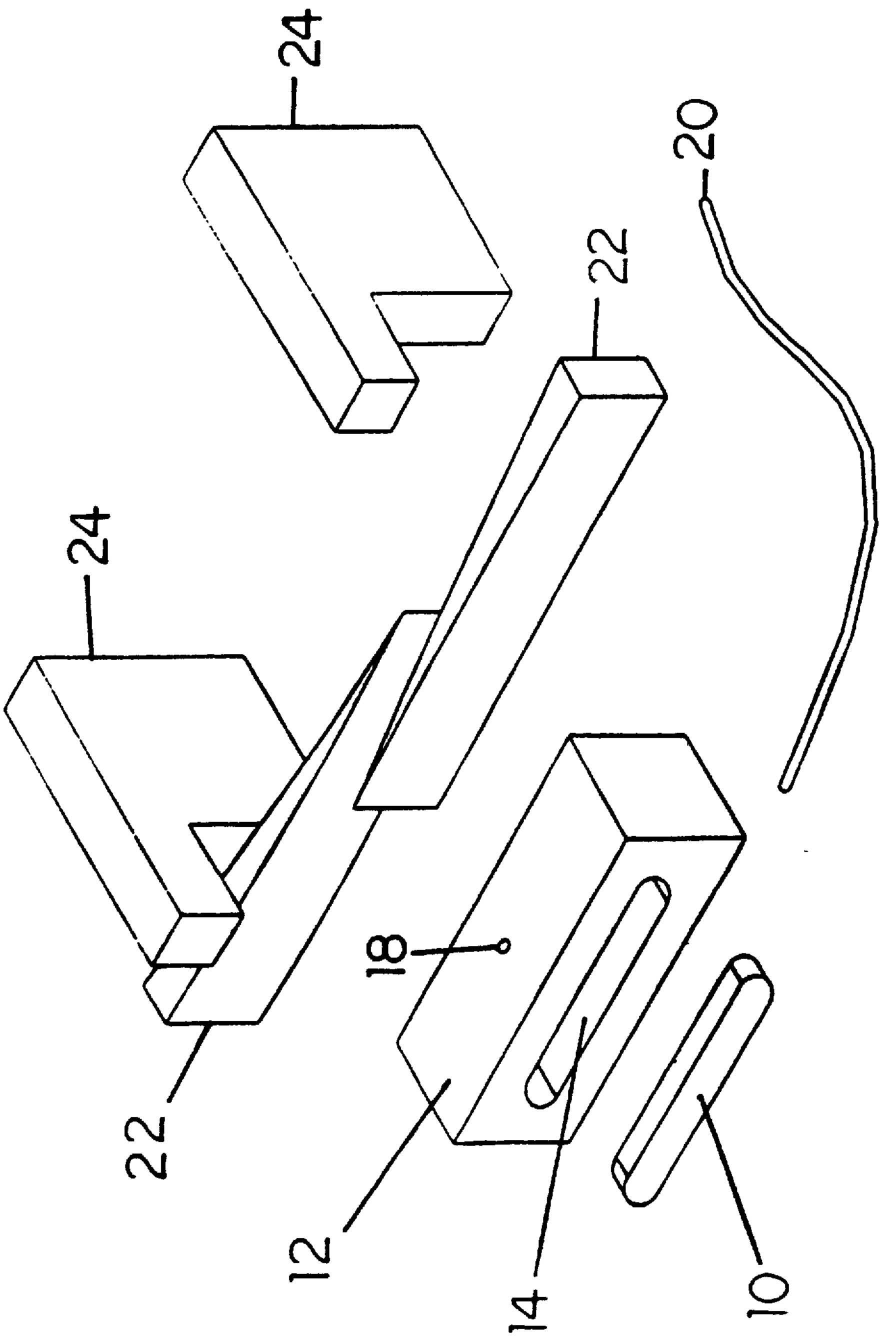
FIG. 1 is a perspective view of the subject invention in relation to the plunger, wedge and L-bracket adapters, without the bolts and chain.
Figure 2:
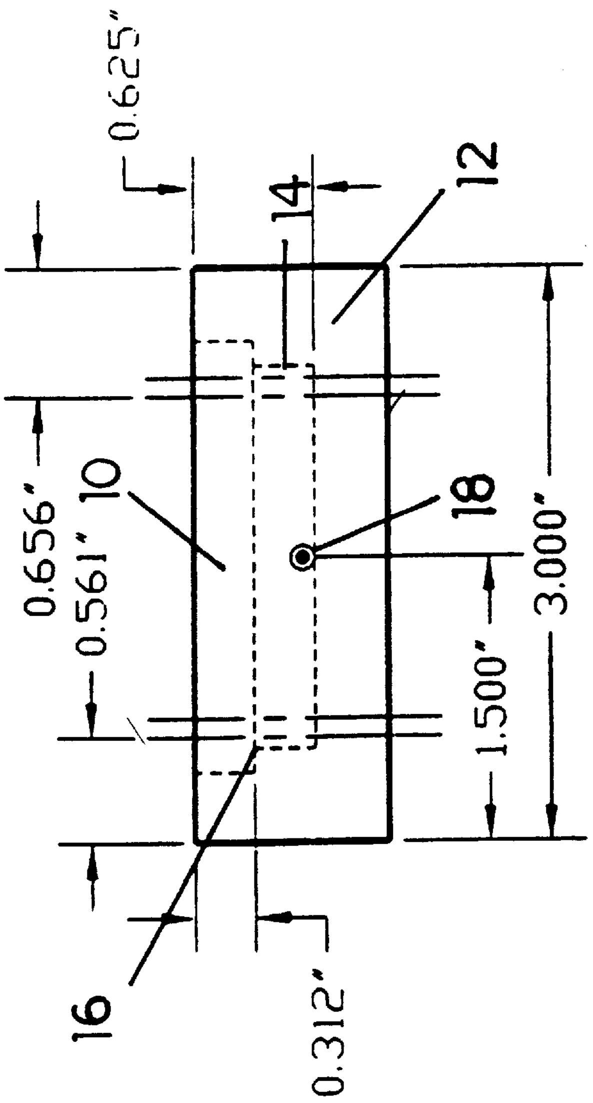
FIG. 2 is a side view of the invention frame
Figure 3:
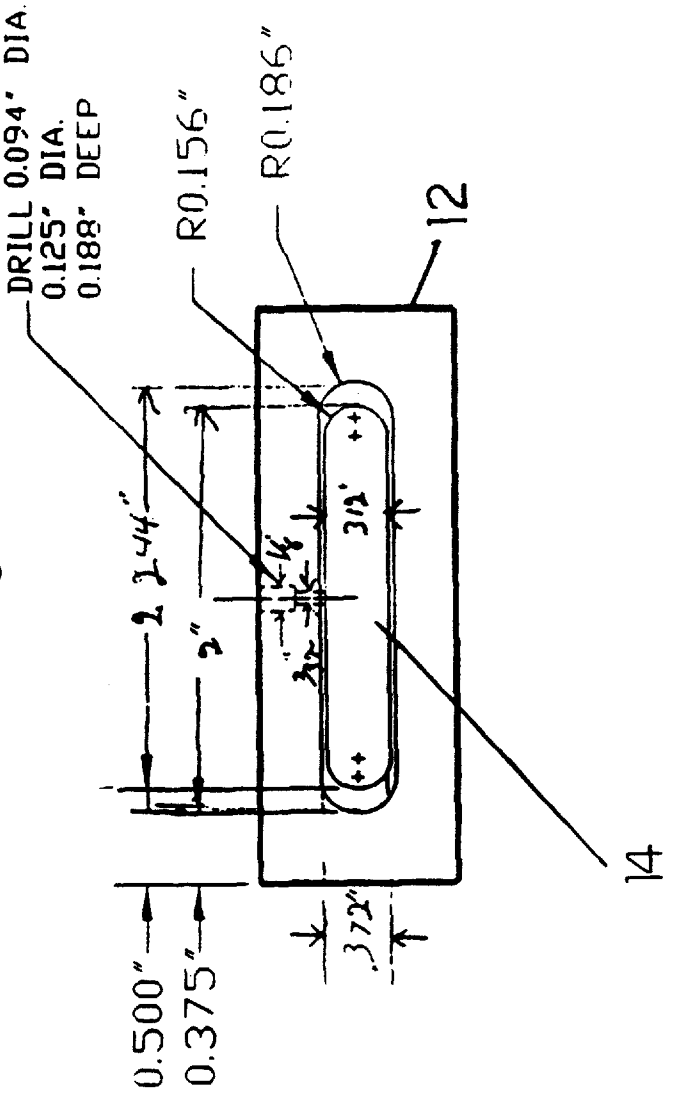
FIG. 3 is a top view of the invention frame
Figure 4:
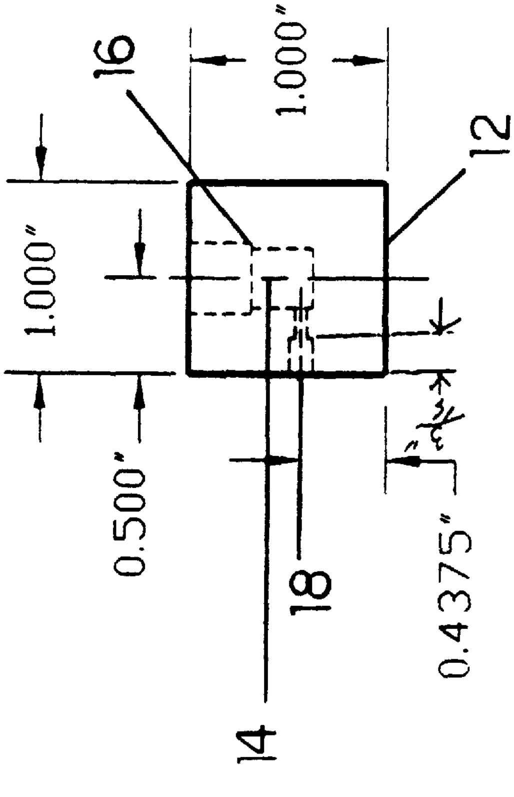
FIG. 4 is a front view of the invention frame
Figure 5:
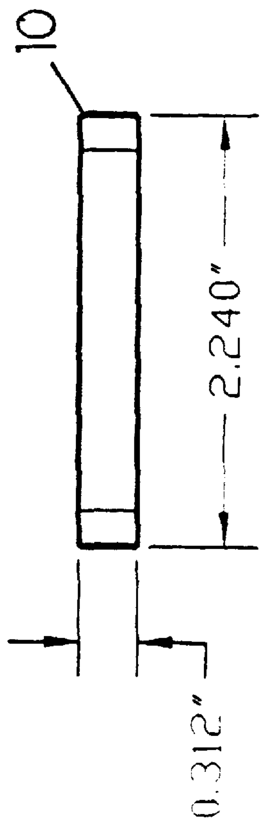
FIG. 5 is side view of the plunger
Figure 6:
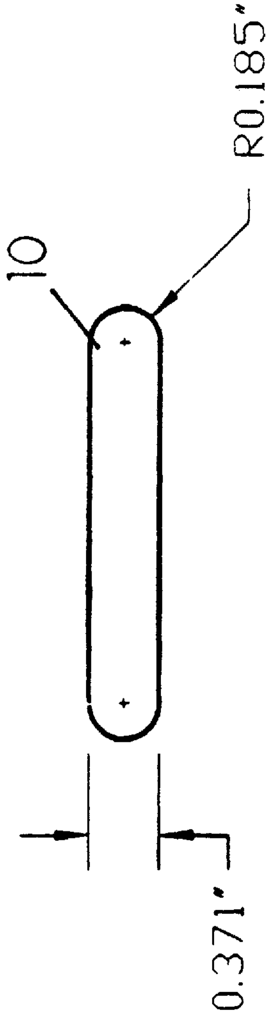
FIG. 6 is a top view of the plunger
Figure 7:
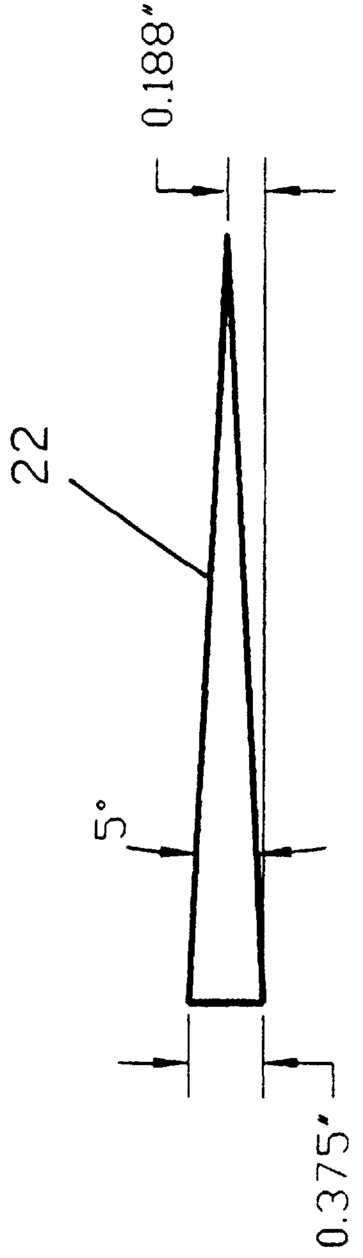
FIG. 7 is a side view of a wedge adapter
Figure 8:
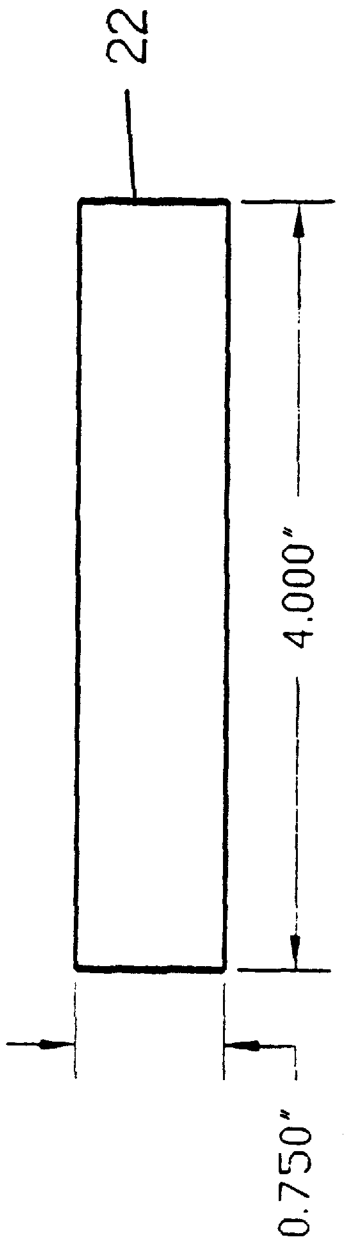
FIG. 8 is a top view of a wedge adapter
Figure 9:
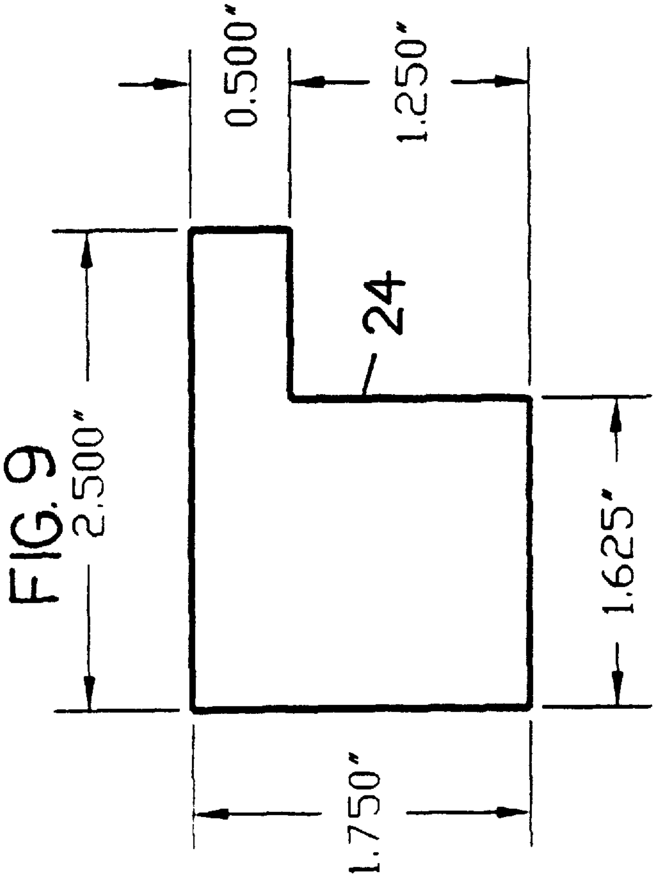
FIG. 9 is a side view of an L-bracket adapter
Figure 10:
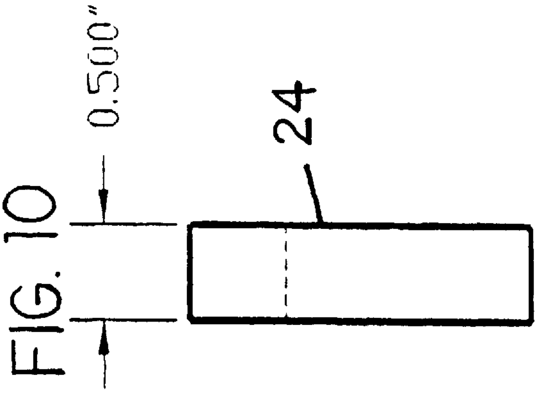
FIG. 10 is a top view of an L-bracket adapter
Figure 11:
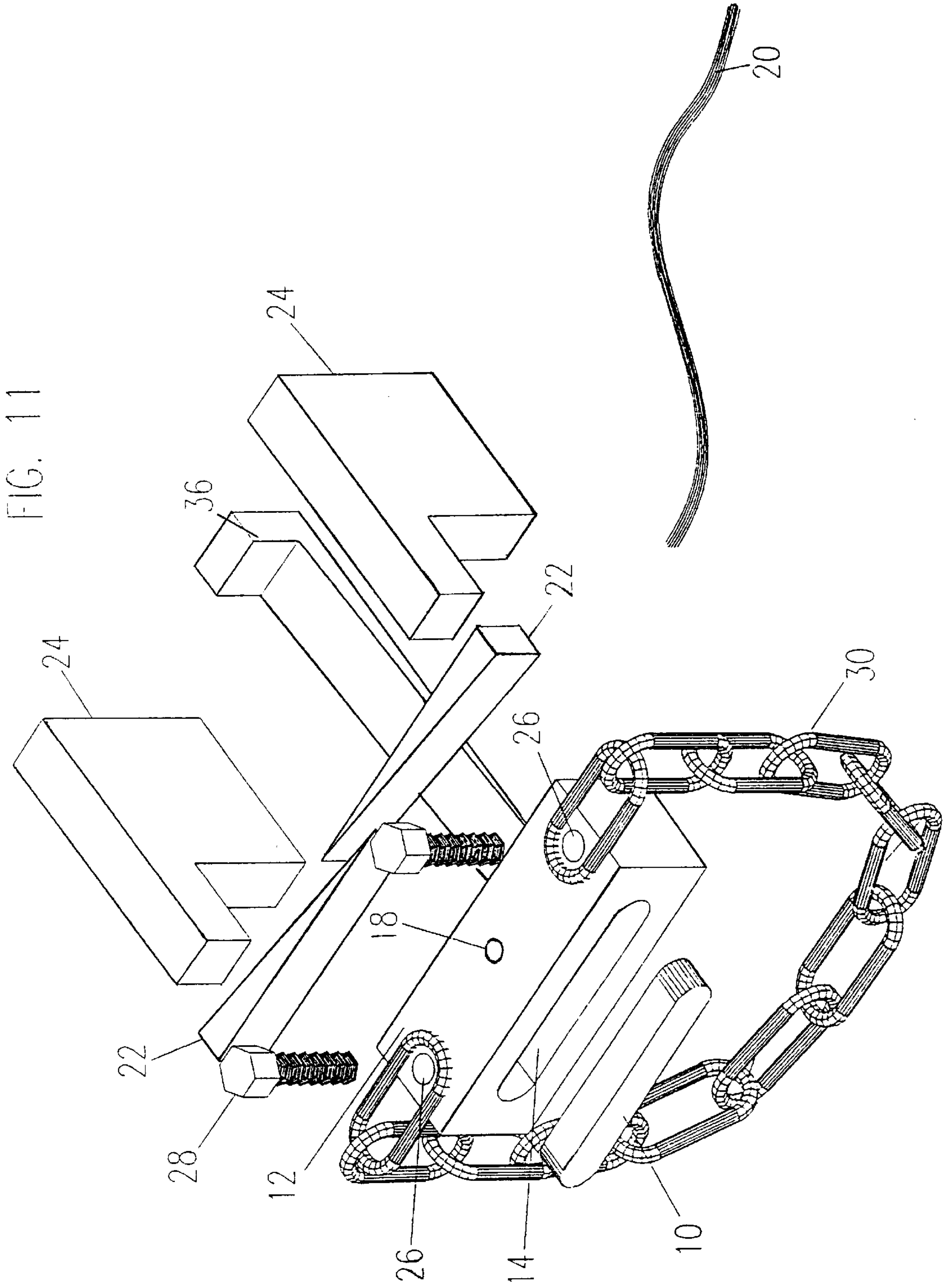
FIG. 11 is a perspective view of the invention frame, with L-brackets and chain in place, showing the threaded bolts and apertures in exploded view.

LIST OF DRAWING REFERENCE NUMERALS:

| Reference No. | Description of Part |
|---|---|
| (10) | plunger |
| (12) | frame |
| (14) | compartment |
| (16) | shoulder |
| (18) | fuse aperture |
| (20) | fuse |
| (22) | wedge adapter |
| (24) | L-bracket adapter |
| (26) | threaded bolt aperture |
| (28) | bolt |
| (30) | chain |
| (32) | hub of sprocket wheel |
| (34) | shaft |
| (36) | block of tapered key |

OPERATION OF INVENTION

Referring to the drawings, the preferred embodiment of the present invention comprises: an explosion-resistant elliptical plunger (10) fitting flush into an explosion-resistant block frame (12) and covering, as a lid, a compartment (14) inside the frame (12), with a fuse aperture (18) extending through one side of the frame (12) into the compartment (14) space, two threaded bolt apertures (26) each holding one bolt (28) on either side of the fuse aperture (18), and a chain (30) connected to and extending between said bolts (28).

In use, the compartment (14) space is filled to the top of a shoulder (16) with gun powder or similar explosive and the plunger (10) seated on top of the gunpowder so that the top external surface of the plunger (10) rests flush with the external surface of the frame (12) and the bottom edge of the plunger (10) rests firmly on the compartment shoulder (16). The appropriate measure of gun powder is predetermined and only that amount will fit into the compartment (14) space while still allowing the plunger (10) to sit properly.

The apparatus is then placed in the space between a hub (32) and the block of the tapered key (36) to be removed, with the plunger (10) facing the hub (32), fuse aperture (18) and bolts (28) up. A set of explosion-resistant wedges (22) and L-bracket adapters (24) of various sizes will accompany the invention and can be inserted at appropriate locations between the frame, hub and tapered key to hold the invention in position and obtain a snug fit between all components.

In the preferred embodiment, two L-bracket adapters (24) are placed with crooks on the invention frame (12), after the frame (12) is set in place between a hub (32) and block of the tapered key (36), and welded or otherwise secured to the tapered key block (36).

A piece of wicking or fuse (20) is then inserted through the fuse aperture (18) such that one end communicates with the gun powder inside the compartment (14). When the fuse (20) is lit, the resulting explosion of gun powder thrusts the plunger (10) and frame (12) of the invention in opposite directions, the plunger (10) toward the hub (32) and the frame (12) toward the tapered key block (36), with force sufficient to loosen the key for removal.

The invention can be removed immediately and reused indefinitely.

The embodiments of the invention in which particular property or privilege is claimed are defined as follows:

I claim:

1. An apparatus for the removal of tapered keys comprising:

a. an explosion-resistant plunger;

b. an explosion-resistant block frame into which the plunger fits;

c. a compartment in the frame into which a predetermined amount of gunpowder or, similar explosive, can be contained under the plunger;

d. a shoulder inside the compartment upon which the bottom of the plunger rests so that the top external surface of the plunger is flush with the external surface of the block frame when no more than a predetermined measure of explosive is placed in the compartment;

e. a fuse;

f. a fuse aperture in the frame allowing insertion of a fuse from the exterior of the frame into the compartment containing explosive;

g. two explosion-resistant L-shaped bracket adapters, with crooks set on the block frame and welded or otherwise secured to the tapered key block to hold the frame in position, obtain a tight fit between all components, and increase surface area between the invention frame, tapered key block, and machinery from which a tapered key is to be removed;

h. two threaded apertures in the frame;

i. a bolt threadedly engaged with each of the threaded apertures;

j. a length of stainless steel chain or a similarly flexible and strong member connected at each end to one of the bolts with the length wrapped around the shaft end from which a tapered key is to be removed.

2. The invention as described in claim 1 with explosion resistant adapters in wedge shapes for insertion between a hub and the block frame or between a hub and the L-shaped brackets.

* * * * *